US012682460B2

(12) United States Patent
Querbes et al.

(10) Patent No.: US 12,682,460 B2
(45) Date of Patent: Jul. 14, 2026

(54) METHOD FOR AUTOMATIC SEGMENTATION OF A DENTAL ARCH

(71) Applicants: PEARL 3D, Salon-de-Provence (FR); Olivier Querbes, Vallesvilles (FR); Véronique Querbes-Duret, Vallesvilles (FR)

(72) Inventors: Olivier Querbes, Vallesvilles (FR); Véronique Querbes-Duret, Vallesvilles (FR)

( * ) Notice: Subject to any disclaimer, the term of this patent is extended or adjusted under 35 U.S.C. 154(b) by 243 days.

(21) Appl. No.: 18/009,626

(22) PCT Filed: Jun. 9, 2021

(86) PCT No.: PCT/EP2021/065454
§ 371 (c)(1),
(2) Date: Dec. 9, 2022

(87) PCT Pub. No.: WO2021/250091
PCT Pub. Date: Dec. 16, 2021

(65) Prior Publication Data
US 2023/0206451 A1    Jun. 29, 2023

(30) Foreign Application Priority Data
Jun. 10, 2020    (FR) ...................................... 2006077

(51) Int. Cl.
*G06T 7/11* (2017.01)
*G06T 7/143* (2017.01)
G06T 7/162 (2017.01)

(52) U.S. Cl.
CPC ................ *G06T 7/11* (2017.01); *G06T 7/143* (2017.01); *G06T 7/162* (2017.01)

(58) Field of Classification Search
CPC ............ G06T 7/11; G06T 7/143; G06T 7/162
See application file for complete search history.

(56) References Cited

U.S. PATENT DOCUMENTS

| 2018/0028294 A1 | 2/2018 | Azernikov | |
| 2018/0182101 A1* | 6/2018 | Petersen | ................... G06T 7/60 |
| 2021/0196434 A1* | 7/2021 | Cramer | ................. G06T 7/0012 |

OTHER PUBLICATIONS

Evangelos Kalogerakis et al., 3D Shape Segmentation with Projective Convolutional Networks, Arxiv.org, Cornell Univ. Library (Dec. 8, 2016).

(Continued)

*Primary Examiner* — Antonio A Caschera
(74) *Attorney, Agent, or Firm* — CRGO Global; Steven M. Greenberg

(57) ABSTRACT

The invention relates to a method for automatic segmentation of a dental arch that comprises acquiring a three-dimensional surface of the dental arch, in order to obtain a three-dimensional representation comprising a set of vertices, generating virtual views from the three-dimensional representation, projecting the three-dimensional representation onto each two-dimensional virtual view, in order to obtain an image representing each vertex on the virtual view, processing each image by means of a deep learning network, carrying out inverse projection of each image in order to assign, to each vertex of the three-dimensional representation, one or more pixels of the images in which the vertex appears and to which it corresponds, and assigning one or more probability vectors to each vertex, determining the class of dental tissue to which each vertex most probably belongs based on the probability vector or vectors.

7 Claims, 7 Drawing Sheets

(56) References Cited

OTHER PUBLICATIONS

Zhige Xie et al, Projective Feature Learning for 3D Shapes with Multi-View Depth Images, Computer Graphics Forum, Journal of the European Assoc. For Computer Graphics, Oxford, vol. 34, No. 7 (Oct. 1, 2015).

Yunhai Wang et al., Projective Analysis for 3D Shape Segmentation, ACM Transactions on Graphics, ACM, vol. 32, No. 6 (Nov. 1, 2013).

Jonathan Long et al., Fully Convolutional Networks for Semantic Segmentation, Proceedings of the IEEE Conference on Computer Vision and Pattern Recognition, vol. 39, No. 4 (Oct. 15, 2015).

* cited by examiner

[Fig. 1]
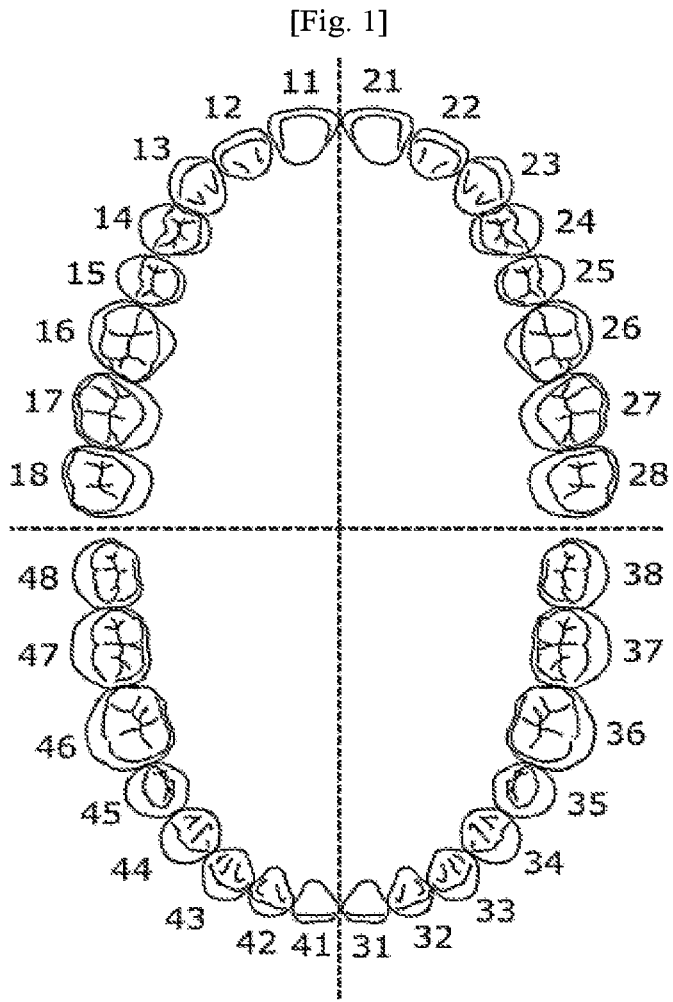

[Fig. 2a]
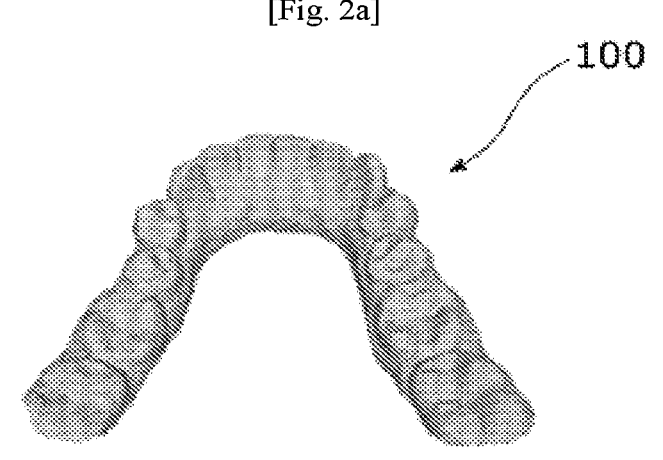
[Fig. 2b]
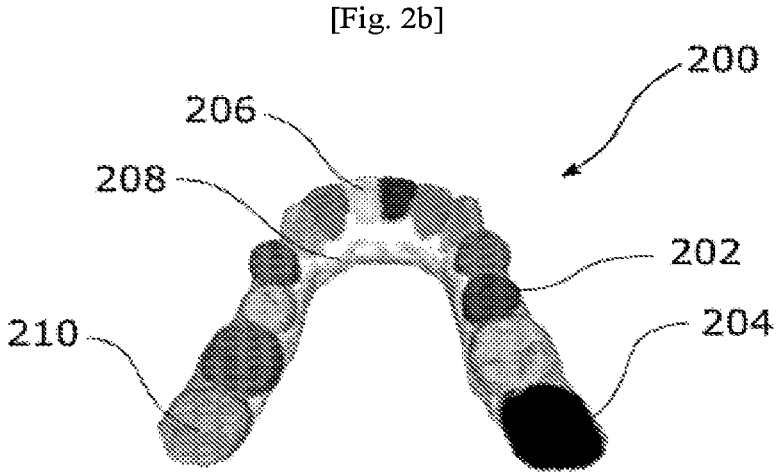

[Fig. 3]
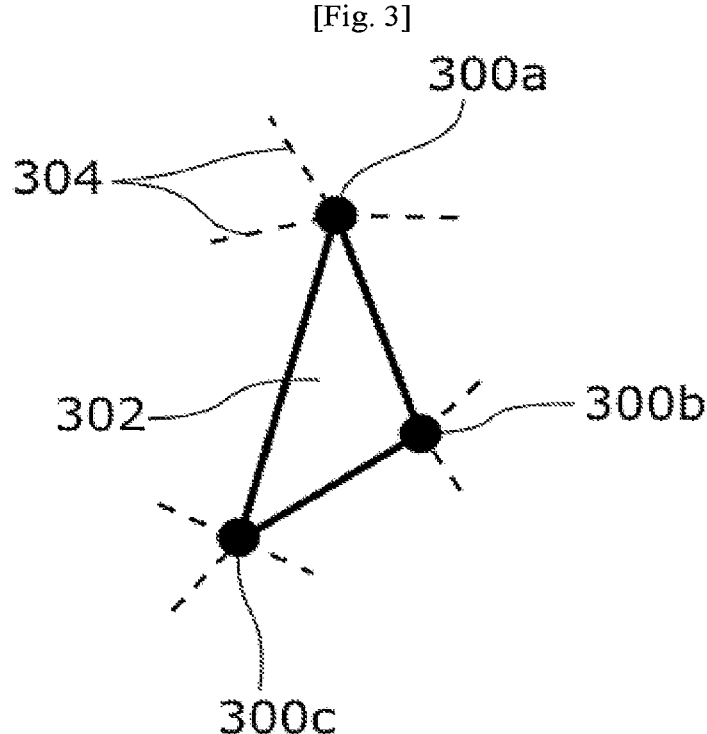

[Fig. 4]
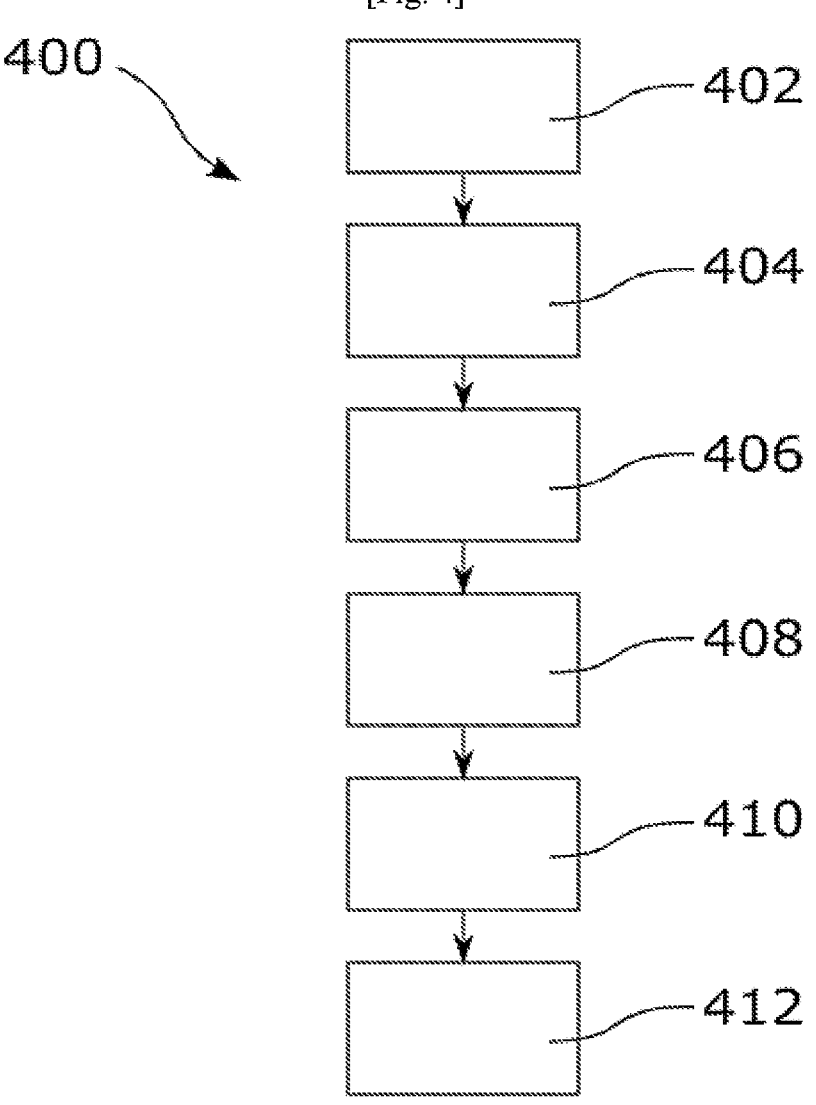
400
402
404
406
408
410
412

[Fig. 5a]

[Fig. 5b]
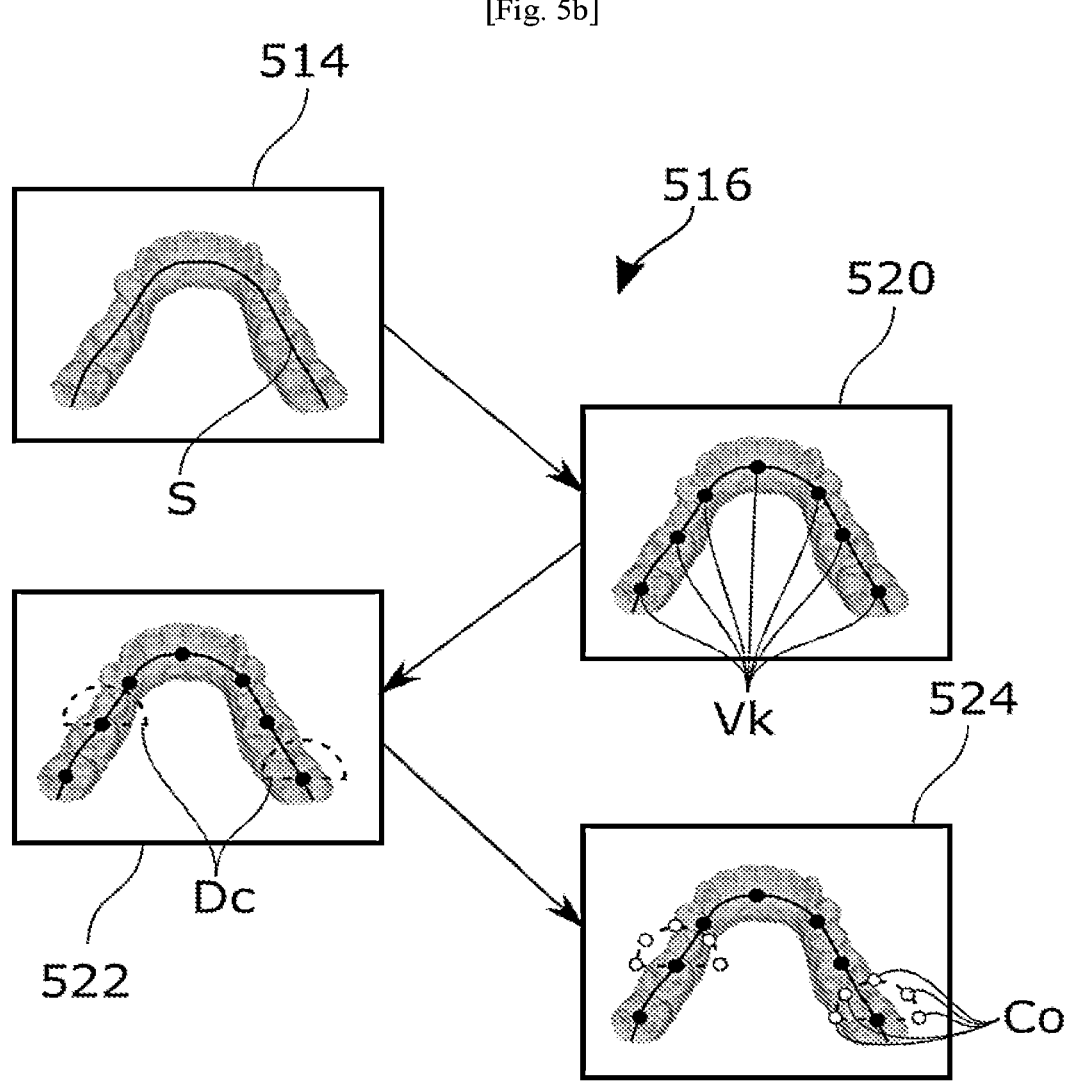

[Fig. 6]
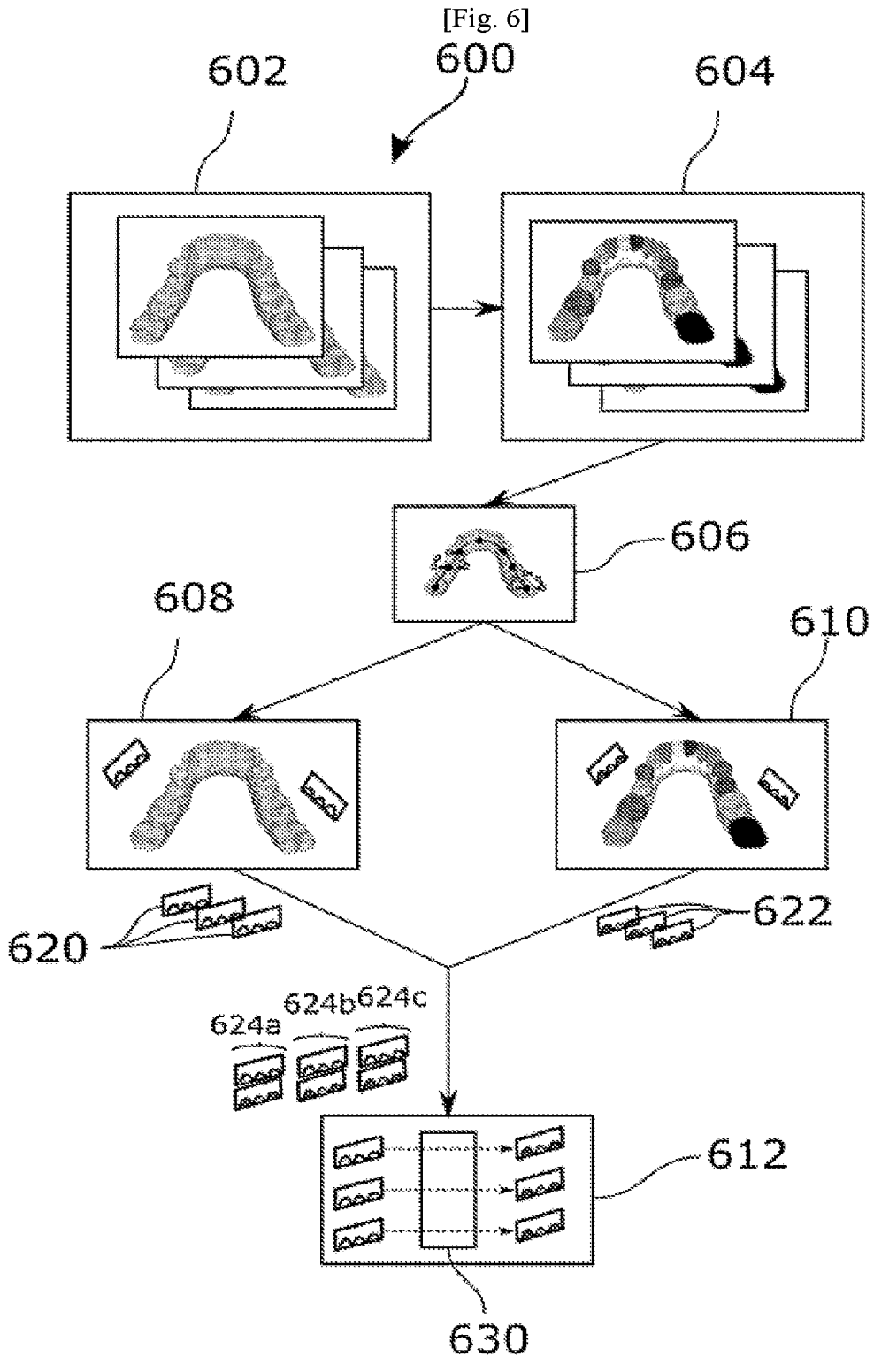

METHOD FOR AUTOMATIC SEGMENTATION OF A DENTAL ARCH

CROSS-REFERENCE TO RELATED APPLICATIONS

This application is a § 371 national phase entry of International Application No. PCT/EP2021/065454, filed Jun. 9, 2021, which claims priority to French Patent Application No. 2006077 filed on Jun. 10, 2020.

TECHNICAL FIELD OF THE INVENTION

The invention relates to a method for automatic segmentation of a dental arch. In particular, the invention relates to a method for accurately and automatically segmenting a three-dimensional reconstruction of a total or partial dental arch.

TECHNOLOGICAL BACKGROUND

The segmentation of a dental arch makes it possible, from a representation of the dental arch, to identify each of the teeth and tissue of the dental arch. This segmented dental arch is used as a basis for various dental treatments (prosthetic, aesthetic, etc.).

The dental arch denotes an arc-shaped set of teeth, which is carried by the bones forming the jaw: in humans, the mandible (or mandibular bone) forms the lower jaw and carries the lower dental arch and the maxilla (or maxillary bone) forms the upper jaw and carries the upper dental arch.

In the context of the dental treatments mentioned above, the impression of the dental arch was previously carried out by an alginate-based physical impression, but this technique is gradually being replaced by digital three-dimensional reconstructions obtained thanks to intra-oral cameras. These digital three-dimensional reconstructions of dental arches make it possible to use Computer-Assisted Design (CAD) tools, which offer the benefits of broadening and simplifying prosthesis processing and/or design capabilities.

CAD sometimes requires a segmentation of the dental arch, i.e. identifying for each part of its three-dimensional representation which tissue it belongs to. The segmentation of these digital three-dimensional reconstructions is generally carried out manually, which is a tedious, costly operation and can slow the whole of the digital process for creating a prosthesis for example.

Automatic or semi-automatic digital methods have been proposed to overcome this problem. In these methods, an algorithm processes this digital three-dimensional representation so as to output a segmented version of this representation.

Existing automatic or semi-automatic methods have a few major drawbacks.

On the one hand, most of these methods are based on mainly geometric considerations. Thus, although they have satisfactory results for the segmentation of conventional dentition, defects appear rapidly as soon as the dental arch deviates significantly from the "average" dentition. However, it is mainly these dental arches that deviate from the average that are most commonly of interest for prosthetic, aesthetic or orthodontic treatments.

Furthermore, these methods still often rely on manual intervention by a human operator, either upstream of the method, or during the implementation of the method, or following a first execution of the method to manually resume local errors. These manual interventions to assist the method may sometimes have constraints above manual segmentation, which is counter-productive.

AIMS OF THE INVENTION

The invention aims to provide a method for automatic segmentation of a dental arch.

The invention aims in particular to provide, in at least one embodiment, a method for automatic segmentation of a dental arch that does not require manual intervention of a human operator for segmentation.

The invention also aims to provide, in at least one embodiment of the invention, a robust method for automatic segmentation of a dental arch, which can be used for dental arches having defects that are remote from a conventional dentition.

The invention also aims to provide, in at least one embodiment of the invention, a fast and inexpensive method for automatic segmentation of a dental arch.

DISCLOSURE OF THE INVENTION

To do this, the invention relates to a method for automatic segmentation of a dental arch, characterized in that it comprises:

- a step of acquiring a three-dimensional surface of the dental arch, in order to obtain a three-dimensional representation of the dental arch in a three-dimensional space, said three-dimensional representation comprising a set of Np three-dimensional points, called vertices, forming vertices of Nf polygonal, preferably triangular faces;
- a step of generating M two-dimensional virtual views from the three-dimensional representation, comprising a step of determining the characteristics of the virtual views comprising a sub-step of determining a wireframe representing the general shape of the dental arch and a sub-step of determining the characteristics of the virtual views by selecting virtual views distributed along the wireframe and directed towards the wireframe;
- a step of projecting the three-dimensional representation onto each two-dimensional virtual view, configured to obtain, for each virtual view, an image representing each vertex and each polygonal face visible on that virtual view;
- a step of processing each image by a previously trained deep learning network associating, with each pixel of each image, a probability vector of size N, each index of the vector representing the probability of belonging of said pixel to a class of dental tissues, from N classes of dental tissues;
- a step of carrying out inverse projection of each image so as to assign to each vertex of the three-dimensional representation a pixel for each image on which the vertex appears and to which it corresponds, and assigning to each vertex the probability vector(s) associated with said one or more pixels;
- a step of determining, for each vertex, the dental tissue class to which said vertex most probably belongs from the probability vector (s) assigned to said vertex.

An automatic segmentation method according to the invention therefore allows an effective, robust automatic segmentation of the dental arch that does not require manual intervention during its execution.

The dental tissue classes are of different types depending on the practical application of the automatic segmentation.

At the minimum, it is for example possible to distinguish the tissues corresponding to a gums and the tissues corresponding to a tooth, in general, the gums and each single tooth independently are distinguished. The teeth are thus categorized independently by their unique dental numbering, for example the notation of the Fédération Dentaire Internationale (*FDI World Dental Federation notation*), the Universal Number System, the Palmer Notation System, etc. Other types of tissue can be distinguished: for example, on one, several or each tooth, the tooth faces may be distinguished (e.g., lingual/palatal face, occlusal face, vestibular face, etc.). The segmentation may also include tissues corresponding to prosthetic material (scan post, scan body, etc.). When the fabric is prosthetic material, it is optionally possible to recognize the mark and/or the model thereof, for example by its shape. Recognition of a prosthetic material model can make it possible to use a pre-recorded 3D representation of this model in the three-dimensional representation of the dental arch.

The method may be used for a single (upper or lower) dental arch, or for all of the dental arches.

The previously trained deep learning Network is for example a convolutional neural network (CNN), this type of network being particularly advantageous for processing two-dimensional images. As the method uses the CNNs more particularly for image segmentation tasks, it makes use of a sub-class of fully convolutional CNNs, called fully convolutional networks (FCNs) In particular, this type of network is described in the article: "Fully Convolutional Networks for Semantic Segmentation", Long et al., 2014. More generally, there are deep learning networks or deep learning neural networks.

The three-dimensional representation of the dental arch is easily obtained by acquiring the three-dimensional surface, for example by an intraoral camera with structured light, or with passive light (stereoscopy). Instead of directly processing the three-dimensional representation, which requires many resources, the method according to the invention uses two-dimensional virtual views of this three-dimensional representation. The use of two-dimensional virtual views greatly simplifies the modeling of the dental arch for its treatment, which makes treatment possible. The use of a two-dimensional projective space instead of considering a three-dimensional space in its entirety makes it easier to use the CNN deep learning networks. Determining the characteristics of the virtual views via the sub-step of determining a wireframe representing the general shape of the dental arch makes it possible to ensure that all the vertices are visible in the virtual views, that sufficient vertices are visible in several virtual views, and the images obtained from the virtual views are usable by the deep learning network. The automatic segmentation method according to the invention is therefore optimized for the automatic segmentation of a dental arch thanks to the taking into account of the wireframe of the dental arch for the generation of virtual views.

This determination of the characteristics can be carried out independently of the knowledge of the actual spatial positions mentioned above.

Furthermore, the management of the two-dimensional data is less expensive in storage space, and requires fewer resources to be processed.

The use of a multitude of two-dimensional images makes it possible to be able to assign a plurality of probability vectors to a vertex. By combining the probabilities of several of these probability vectors, a more reliable determination of the dental tissue class to which the vertex belongs is obtained, which reduces the risks of errors on a classification of a vertex and thereby the need to use subsequent manual corrections.

The invention therefore differs from automatic processing carried out directly on three-dimensional representations of the prior art, thanks to the use of two-dimensional data which allows a more robust, faster and inexpensive processing in terms of resources for a result less conducive to local errors.

The steps of generating two-dimensional virtual views, of projecting the three-dimensional representation, of processing each image by a deep learning network, of carrying out inverse projection of each image, and of determining the class of dental tissue, are preferentially implemented by a computing device, such as a computer or a plurality of computers, in particular by one or more computer programs executed on the computing device. More particularly, the method is preferably implemented in a module specialized in the Processing of three-dimensional and two-dimensional Graphics data, such as a Graphics Processing Unit (GPU), executing a computer program specialized in the processing of three-dimensional and two-dimensional data, for example OpenGL.

The step of acquiring the surface of the arch is preferably implemented by the combination of an acquisition device, for example an intraoral camera, and an acquisition computer program processing the data acquired by the acquisition device in order to obtain the three-dimensional representation of the dental arch. Examples of oral cameras that can be used are for example the "Wow™" camera from Biotech Dental.

Advantageously and according to the invention, prior to the step of processing each image by the learning network, a step of assigning each pixel of each image of at least one discriminatory value, said discriminatory value being a numerical value representative of a characteristic of the vertex when said pixel corresponds to a vertex on the virtual view, and to an interpolation of the characteristics of the vertices of the polygonal face when said pixel corresponds to a polygonal face on the virtual view.

According to this aspect of the invention, the discriminatory value is a numerical value assigned to each pixel which allows the composition of an image in which each pixel is representative of the vertex corresponding to this pixel or vertices of a polygonal face corresponding to this pixel. The image obtained thus resembles a 2D matrix in which each pixel has a discriminatory value, and can be processed by the deep learning network.

Advantageously and according to the invention, the discriminatory value may be of a value type selected from the following list of value types:

RGB vertex value obtained during the acquisition of a three-dimensional surface value of three-dimensional curvature at the vertex a distance value between the vertex and an optical center of the virtual view on which it projects an angle between a normal of the vertex and a direction of sight of the virtual view.

According to this aspect of the invention, the discriminatory value can be of different types, which makes it possible to obtain images of different types, for example an RGB image if the acquisition was carried out by an intraoral camera allowing color reconstruction, an image related to a depth map (case of the vertex—optical center distance), an image where the curvatures are visible, etc. This value can thus be inherent to the vertex independently of its ratio to virtual views (for example, its three-dimensional curvature), or represent a relationship between the vertex and the virtual view (for example the distance between the vertex and the optical center of the virtual view, or the angle between its normal and the direction of sight of the virtual view).

Other types of discriminatory values may be used according to the device used for image acquisition, the desired dental treatment, the dental tissue classes to be identified during segmentation, etc.

Advantageously and according to the invention, several discriminatory values can be combined with each other, in order to produce two-dimensional virtual views comprising several channels according to a third dimension, each of these channels carrying the information of a type of data in particular (for example first channel for the curvature, second channel for the vertex-optical center distance, etc.).

Advantageously and according to the invention, each virtual view is defined by an optical center included in the three-dimensional space, and by a picture-taking direction along a picture-taking axis.

According to this aspect of the invention, the virtual view resembles a virtual camera view which may, in certain cases, correspond to an actual camera view obtained in the step of acquiring the three-dimensional surface. More particularly, during the phase of acquisition of the three-dimensional surface, the intraoral camera records, in addition to the three-dimensional reconstruction, the successive spatial positions of the camera relative to the three-dimensional surface. These positions can be exploited during the segmentation calculation, by recreating the virtual views according to these same spatial positions. In this way, all these virtual views clearly cover all of the three-dimensional surface, given that they are themselves used to generate it.

The optical center corresponds to the picture-taking point, which is a point in the three-dimensional space and corresponds to the location of the virtual camera associated with the virtual view.

Other characteristics can be associated with each virtual view, such as the field of view, the height and the width in pixels of the virtual view generated, the intrinsic calibration matrix (focal length and optical center). These other characteristics will be chosen as fixed upstream of the design of the segmentation method described in this invention.

By way of indication, it is possible to choose the width and height of the virtual view (e.g. 1280 pixels*960 pixels), decide for example that the virtual view must cover a planar surface of 3*2.25 centimeters located 1 centimeter away from its optical center, and place the optical center at the center of the image. These constraints make it possible to easily find the focal length of the calibration matrix.

Advantageously and according to the invention, the number of two-dimensional virtual views generated is between 30 and 90 views, preferably between 50 and 70 views.

According to this aspect of the invention, this number of virtual views makes it possible to sufficiently cover a conventional human adult dentition to obtain a robust result, while limiting the number of views to be processed by the deep learning network.

Advantageously and according to the invention, the step of determining, for each vertex, the dental tissue class to which it most probably belongs comprises the execution of a graph cut algorithm taking as a parameter for each vertex said one or more probability vectors assigned to said vertex.

The graph cut algorithm is better known as a graph-cut.

According to this aspect of the invention, this algorithm makes it possible not to consider only the probability vector(s) associated with a vertex to determine the class of dental tissue, but also to consider parameters from neighboring vertices in order to guarantee the absence of artifacts and point errors in the determination of dental tissue classes.

The invention also relates to a device for automatic segmentation of a dental arch, characterized in that it comprises:

a module for acquiring a three-dimensional surface of the dental arch, configured to obtain a three-dimensional representation of the dental arch in a three-dimensional space, said three-dimensional representation comprising a set of Np three-dimensional points, called vertices, forming vertices of Nf polygonal, preferably triangular faces;

a module for generating M two-dimensional virtual views from the three-dimensional representation, configured to determine characteristics of the virtual views by determining a wireframe representing the general shape of the dental arch and by determining the characteristics of the virtual views by selecting virtual views distributed along the wireframe and directed towards the wireframe;

a module for projecting the three-dimensional representation onto each two-dimensional virtual view, configured to obtain, for each virtual view, an image representing each vertex and each polygonal face visible on the virtual view;

a module for processing each image by a previously trained deep learning network associating, with each pixel of each image, a probability vector of size N, each index of the vector representing the probability of belonging of said pixel to a class of dental tissues, from N classes of dental tissues;

a module for carrying out inverse projection of each image so as to assign to each vertex of the three-dimensional representation one or more pixels of the images wherein the vertex appears and to which it corresponds, and assigning to each vertex the probability vector(s) associated with said one or more pixels;

a module for determining, for each vertex, the dental tissue class to which said vertex most probably belongs from the probability vector (s) assigned to said vertex.

Advantageously, the automatic segmentation method according to the invention is implemented by the automatic segmentation device according to the invention.

Advantageously, the automatic segmentation device according to the invention implements the automatic segmentation method according to the invention.

A module may for example consist of a computing device such as a computer, a set of computing devices, an electronic component or a set of electronic components, or for example a computer program, a set of computer programs, a library of a computer program or a function of a computer program executed by a computing device such as a computer, a set of computing devices, an electronic component or a set of electronic components.

The invention also relates to a method for supervised training of a deep learning network, characterized in that it comprises:

a step of acquiring a plurality of three-dimensional surfaces of a plurality of dental arches, in order to obtain a plurality of three-dimensional training representations of the dental arches in a three-dimensional space, said three-dimensional training representations each comprising a set of Np three-dimensional points, called vertices, forming vertices of Nf polygonal, preferably triangular faces;

a step of manually segmenting, by a human operator, each three-dimensional training representation of the dental arch, wherein is assigned to each vertex of the three-dimensional representation a class of dental tissue, so as to obtain a segmented three-dimensional representation for each three-dimensional training representation;

a step of generating, for each three-dimensional representation of M two-dimensional virtual views from the three-dimensional training representation comprising a sub-step of determining a wireframe representing the general shape of the dental arch and a sub-step of determining the characteristics of the virtual views by selecting virtual views distributed along the wireframe and directed towards the wireframe;

a step of projecting, for each three-dimensional training representation, the discriminatory value(s) chosen for the three-dimensional training representation on each two-dimensional virtual view, configured to obtain, for each virtual view, a two-dimensional input image representing in each pixel the discriminatory value of the vertex or the polygonal face projecting over the virtual view;

a step of projecting, for each segmented three-dimensional representation, the segmented three-dimensional representation on each two-dimensional virtual view, configured to obtain, for each virtual view, a two-dimensional output image representing, in each pixel, the tooth's dental tissue class or the polygonal face projecting onto the two-dimensional output image;

a step of training the deep learning network via processing of each pair of images comprising an input image and an output image respectively derived from the projection with the same virtual view of the discriminatory value(s) for each three-dimensional training representation and its associated segmented three-dimensional representation.

The deep learning method constitutes a step prior to the automatic segmentation carried out in the automatic segmentation method according to the invention, and can thus be advantageously integrated into the automatic segmentation method as a preliminary step prior to the step of processing the images obtained via the virtual views. The supervised learning method in particular makes it possible to train the deep learning network used in the automatic segmentation method, in the step of processing the images obtained via the virtual views.

The training network is thus trained beforehand by providing already-segmented images coming from virtual views. This supervised learning using images from virtual views thus processes only two-dimensional data, which allows for fast and robust learning. The training network thus trained requires fewer resources, is faster and more effective to perform processing operations on new non-segmented images, compared to a training network that would be trained only on three-dimensional data without using virtual views and two-dimensional images. Even if supervised training involves a human operator, no manual intervention is necessary to intervene in the automatic segmentation method once the deep learning network is sufficiently trained.

The invention also relates to a method for automatic segmentation, a device for automatic segmentation, and a method for supervised learning of a deep learning network, characterized in combination by all or part of the features mentioned above or below.

LIST OF FIGURES

Further aims, features and advantages of the invention will become apparent upon reading the following description, which is provided solely by way of non-limiting example, and which refers to the accompanying drawings, in which:

FIG. 1 is a dental diagram representing the numbering of human teeth according to the FDI notation system.

FIG. 2a is a schematic view of a three-dimensional representation of a dental arch obtained following a step of acquiring the three-dimensional surface of the dental arch by a segmentation method according to one embodiment of the invention;

FIG. 2b is a schematic view of a three-dimensional representation of a dental arch segmented by an automatic segmentation method according to the invention;

FIG. 3 is a schematic view of a plurality of vertices and a face formed by said vertices of a three-dimensional representation of a dental arch;

FIG. 4 is a schematic view of the steps of an automatic segmentation method according to the invention, FIG. 5a is a schematic view of a step for determining the characteristics of the virtual views of an automatic segmentation method according to one embodiment of the invention;

Figure 5A:
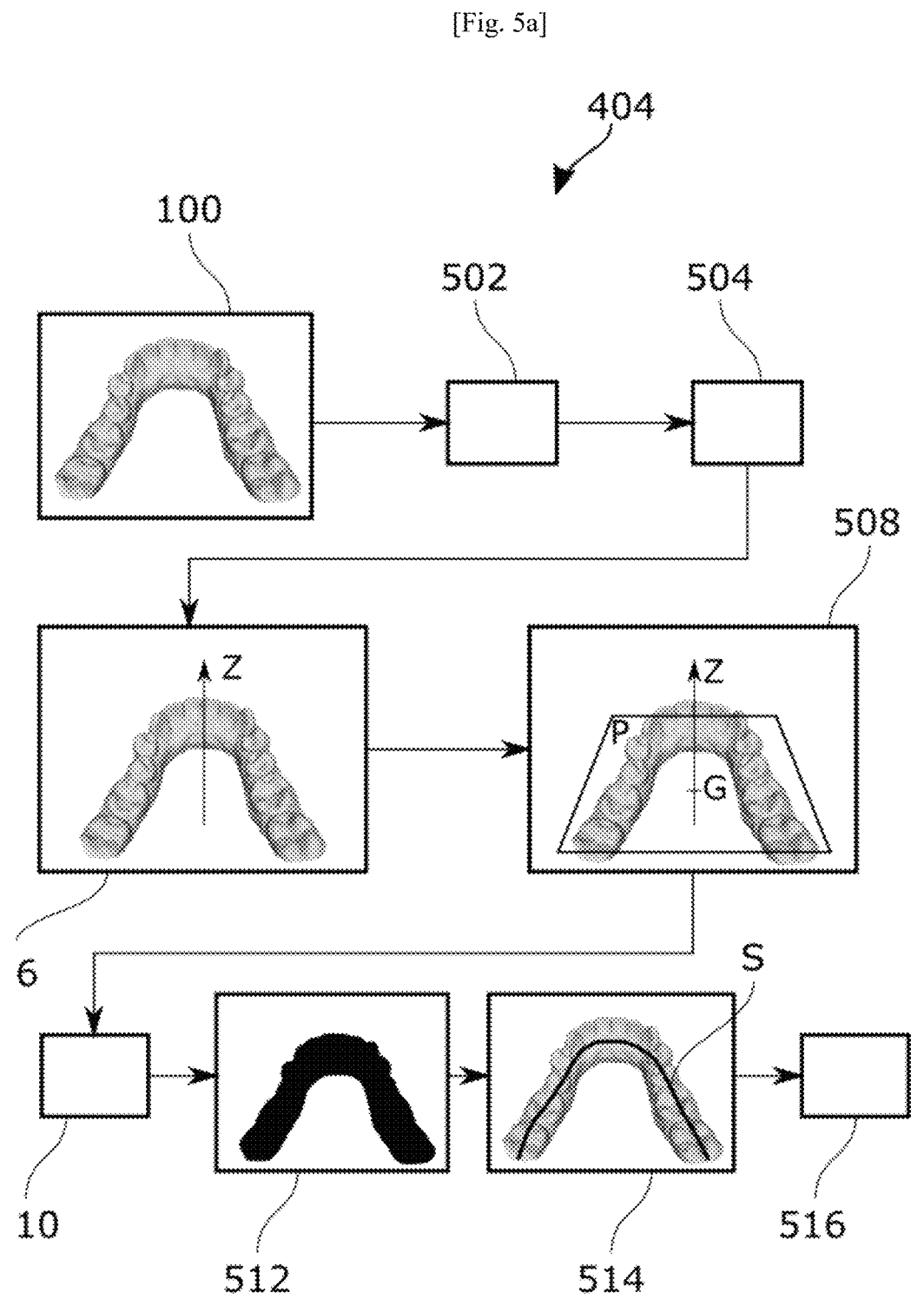

FIG. 5b is a schematic view of a sub-step of determining the characteristics of the virtual views by selecting virtual views distributed along the wireframe and directed towards the wireframe, of an automatic segmentation method according to one embodiment of the invention;

FIG. 6 is a schematic view of a method for supervised learning of a deep learning network according to one embodiment of the invention.

DETAILED DESCRIPTION OF ONE EMBODIMENT OF THE INVENTION

For the sake of illustration and clarity, scales and proportions are not strictly adhered to in the drawings.

Moreover, identical, similar, or analogous elements are denoted using the same reference signs throughout the drawings.

FIG. 1 is a diagram representing adult human dentition, wherein each tooth is associated with its Federation Dentaire Internationale notation (also known as FDI World Dental Federation notation). In this notation, each tooth is identified by two notation digits; the dentition is separated into four quadrants, and the quadrant in which the tooth is located corresponds to the first notation digit: quadrant 1 at the top left, quadrant 2 at the top right, quadrant 3 at the bottom right, quadrant 4 down left ("right" and "left" being understood from the point of view of a dentist observing a patient's dentition). The second digit of the notation indicates the corresponding tooth, in quadrant, of 1 the central incisor 8 the wisdom tooth.

There is also an FDI notation for temporary teeth, not detailed here.

The automatic segmentation method according to the invention makes it possible to distinguish each of these teeth of the dental arch and can assign the numbering shown here to each of these teeth.

FIG. 2a schematically represents a three-dimensional digital representation 100 obtained following a step of acquiring the three-dimensional surface of the dental arch by a segmentation method according to one embodiment of the invention.

The three-dimensional digital representation 100 is for example made by an intraoral camera, using several different technologies impacting the three-dimensional digital representation and the characteristics of this three-dimensional digital representation; for example, the camera can obtain RGB data making it possible to identify colors, curvature data making it possible to identify the general shape of the dental arch, depth data by stereoscopy in passive light or by structured light, etc.

The three-dimensional digital representation 100 comprises a set of Np three-dimensional points, called vertices, forming the vertices of Nf polygonal, preferably triangular, faces. This polygonal representation is common in three-dimensional surface management methods.

For illustration, FIG. 3 schematically depicts a plurality of vertices 300a, 300b, 300c and a triangular face 302 formed by said vertices of a three-dimensional representation of a dental arch. The use of triangular faces is conventional and makes it possible to easily identify each face from three vertices without additional parameters, but polygonal faces with more than three vertices can be used. Each vertex 300a, 300b, 300c is connected to the other two vertices to form the face 302, and each vertex can be connected to other vertices via for example edges 304 (shown partially in dotted lines) to form other faces, not shown.

In connection with FIG. 2a, FIG. 2b shows the three-dimensional representation 200 of the dental arch after segmentation, in which a gray level has been associated with each triangular face whose vertices belong to the same class of dental tissue. Each identified dental tissue is shown in a different grey shade at least from its neighbors, in order to show the distinction between two adjacent, different dental tissues. For example, FIG. 2b shows a premolar 202, two molars 204 and 210, an incisor 206 and a gum 208.

This representation has a mainly illustrative objective: in practice, the segmentation consists of the minimum to assign to each vertex a class of dental tissue, without requiring a graphical representation in a grey or color level.

FIG. 4 schematically shows the steps of an automatic segmentation method according to one embodiment of the invention.

The method notably comprises the steps described below.

A step 402 of acquiring a three-dimensional surface of the dental arch makes it possible to obtain a three-dimensional representation of the dental arch in a three-dimensional space, said three-dimensional representation comprising a set of Np three-dimensional points, called vertices, forming vertices of Nf polygonal, preferably triangular, faces; this step notably makes it possible to obtain a three-dimensional representation of the type shown with reference to FIG. 2a. The acquisition of the three-dimensional surface of the dental arch is generally done on a patient by a dentist using an intraoral camera, without surgical intervention. The three-dimensional representation of the dental arch is then transmitted to the prosthetist who, from the three-dimensional representation, schedules a particular treatment (for example the production of prostheses). In this context, the three-dimensional representation in the form of vertices and faces is commonplace.

The method then comprises a step 404 of generating M two-dimensional virtual views from the three-dimensional representation, the objective of which is to reproduce quantitative information of this three-dimensional representation in a two-dimensional projective space; the information is easily represented in this space via two-dimensional images. The M virtual views correspond, for example, to a virtual camera directed toward different locations of the three-dimensional representation of the dental arch. In some cases, none or some or all of the virtual views may correspond to real views acquired by the intraoral camera during the acquisition of the three-dimensional surface.

The virtual views can be defined by different characteristics, in particular a centroid defining an optical center, that is to say the point where the virtual camera is arranged, and a picture-taking direction, that is to say the direction in which the virtual camera is directed to obtain the virtual view. The number M of virtual views and the characteristics of the virtual views are defined so as to allow the set of vertices of the three-dimensional representation to be seen, preferably several times for each vertex, that is all the virtual views covers the whole of the three-dimensional reconstruction.

Step 404 of generating M virtual views can comprise sub-steps (not shown) making it possible to obtain this number M of virtual views and the characteristics of each virtual view:

A first sub-step is a sub-step of determining a wireframe representing the general shape of the dental arch. A second sub-step is a sub-step of determining the characteristics of the virtual views by selecting virtual views distributed along the wireframe and directed towards the wireframe. Step 404 of generating M virtual views can thus be composed, in one of the embodiments, of the following sub-steps, described with reference to FIG. 5a:

a sub-step 502 of calculating a three-dimensional curvature of the three-dimensional representation 100;

a sub-step 504 of detecting cusps of the dental arch in the three-dimensional representation, by thresholding the negative curvatures of the three-dimensional curvature; the cusps of the dental arch delimit the recessed portions of each tooth and are easy to detect by detecting the curvatures.

a sub-step 506 of estimating a normal axis Z, representing the mean of the normals to each detected cusp; the normal axis Z thus represents an axis Z normal to the plane formed by the dental arch.

a sub-step 508 of defining a plane P orthogonal to the normal axis Z and comprising the barycenter G of the three-dimensional reconstruction, the plane P thus substantially represents the plane formed by the dental arch.

a sub-step 510 of projecting the three-dimensional surface onto the plane;

a sub-step 512 of projection of the vertices and the faces of the three-dimensional representation onto this plane, so as to generate a binary two-dimensional mask from this projection, representing in the two-dimensional space a binary value corresponding either to the projection of at least one face of the dental arch, that is representing the areas belonging to the dental arch, or to the absence of a face projecting from the dental arch, that is, representing the areas not belonging to the dental arch.

a sub-step 514 of determining a wireframe S of the dental arch, from said two-dimensional mask, for example using a morphological topological wireframe algorithm, the wireframe corresponding to an average curve of the area where the binary value corresponds to the presence of the dental arch. This wireframe S is attached to the three-dimensional representation, so as to form a three-dimensional wireframe, i.e., characterized in the three-dimensional space of the three-dimensional representation.

a sub-step 516 for determining the characteristics of the virtual views by selecting virtual views distributed along the wireframe and directed towards the wireframe. This sub-step can be carried out differently according to the embodiments, for example according to the morphology of the studied dental arch and/or the desired number of views, but may for example consist of the following sub-steps, described with reference to FIG. 5b:

a sub-step 520 of uniform distribution of three-dimensional anchor points Vk along the wireframe S, for example starting from one of its ends and inserting one point every centimeter, a sub-step 522 for creating three-dimensional half circles Dc (for illustration, only two half-circles are shown) for each anchor point Vk, the center of which is the anchor point Vk, the radius of which of a few centimeters (typically 4 centimeters), and the axis of rotation of which is defined as the three-dimensional orientation of the wireframe in the vicinity of the anchor point Vk, a sub-step 524 of uniform distribution of virtual views along each of these half-circles, for example by inserting the optical center Co of a new virtual view every millimeter and defining the shooting direction of this virtual view starting from this new picture-taking point and looking toward the anchor point Vk (for illustration, only five optical centers are represented for each of the two half-circles shown).

These characteristics therefore make it possible to obtain M shots.

Again with reference to FIG. 4, the automatic segmentation method then comprises a step 406 of projection of the three-dimensional representation onto each two-dimensional virtual view, configured to obtain, for each virtual view, an image representing each vertex and each polygonal face visible on the virtual view: The projection makes it possible to match with the image the vertices visible in the virtual view corresponding to the image. The projection uses, for example, a method of ray casting to match each pixel with a vertex or a face of the three-dimensional representation.

The image obtained is composed of pixels having an assigned discriminatory value representative of the vertex or of the polygonal face to which the pixel corresponds. This discriminatory value is a numerical value that can be representative of the vertex, and depend on the characteristics assigned to the vertex during the acquisition of the three-dimensional representation or during subsequent calculations. For example, if the camera is an RGB camera, the discriminatory value comprises a triplet of RGB values (the triplet being able to be represented, in a known manner, by a unique discriminatory value, for example FFFFFF for white by its RGB hexadecimal representation), or else each RGB value is included in a different channel. The value may in other cases represent a relationship between the vertex and the virtual view (for example the distance between the vertex and the optical center of the virtual view, or the angle between its normal and the direction of sight of the virtual view). The discriminatory value may also be representative of the depth relative to the virtual camera forming the virtual view; in other words, it may represent the distance between the considered vertex and the optical center of the virtual view. Other data can form the discriminatory value, for example the three-dimensional curvature, obtained from the three-dimensional representation.

Furthermore, several discriminatory values can be used for the formation of the image, each of the discriminatory values being stored in a channel Following the projection, when the pixel does not correspond to a vertex but to a triangular face, then the discriminatory value of the pixel is based on an interpolation of the value of the three vertices forming the vertices of the face (for example a linear interpolation).

Each image, in which each pixel has an assigned discriminatory value, is processed in a step 408 of processing each image by a previously trained deep learning network, associating, with each pixel of each image, a probability vector of size N, each index of the vector representing the probability of said pixel belonging to a class of dental tissues, from among N classes of dental tissues.

The deep learning network, or deep learning neural network, is trained beforehand according to a supervised learning method described below with reference to FIG. 6. The deep learning network could assign to each pixel of the image a class of dental tissue, which would be the class having the highest probability of belonging. However, better results and a reduction in errors are enabled in the following steps using a probability vector of the pixel belonging to a class of dental tissues.

The probability vector is of size N, corresponding to the N predetermined dental tissue classes which can be assigned to each pixel. These N classes may correspond to the gums, to a tooth in particular identified by its dental notation, to prosthetic equipment, etc.

The method further comprises a step 410 of carrying out inverse projection of each image so as to assign to each vertex of the three-dimensional representation one or more pixels of the images wherein the vertex appears and to which it corresponds, and assigning to each vertex the probability vector(s) associated with said one or more pixels.

Inverse projection makes it possible to return to the three-dimensional representation after passing through the two-dimensional images. The link between a pixel and a vertex, which has already been established in the projection step, is preferably recalculated in order to avoid having to store the link between each vertex and its projection or projections in each image, which may require a large storage space and which does not necessarily allow a faster processing than a recalculation.

At each vertex is assigned to a probability vector if it is visible only in a virtual image, and otherwise with as many probability vectors as there are images in which it has been projected. Since the virtual views have been parameterized so that each vertex is projected onto an image, no vertex must have any probability vector assigned to it. Preferably, each vertex has several probability vectors assigned to it in order to maximize the chances of identifying the right class of dental tissue.

The method finally comprises a step 412 of determining, for each vertex, the dental tissue class to which said vertex most probably belongs based on the probability vector(s) assigned to said vertex.

This assignment to each vertex of the associated class corresponds to the automatic segmentation. As already described with reference to FIG. 2b, the segmentation makes it possible to obtain three-dimensional representations that differ, for example by grey levels or colors, each element belonging to the same dental tissue, but in practice the segmentation consists only of assigning to each vertex a class of dental tissue, and these data can be used as such.

The class of dental tissue used could simply be the one whose probability is the strongest by averaging the set of probability vectors assigned to the vertex. However, in order to avoid the local artifacts and errors, it is preferable to use a combination graph-cut algorithm, making it possible to also take into account the probability vectors of neighboring vertices.

The aim of the graph-cut algorithm is to assign to each vertex the class having a strong probability, while promoting local class homogeneity. This is because, on the dental arch, there is a high probability that neighboring vertices have the same class, except if they are separated by a zone of high curvature. For example, two neighboring vertices on the same molar have the same class, and the local curvature between them is low (a tooth is relatively smooth). On the other hand, a vertex on a molar and a vertex on the gums (therefore belonging to two different classes) are separated by a zone of high spatial curvature (as the insertion of the tooth into the gum generates a spatial "break"). To account for this phenomenon, the graph cut used can take as parameter a unit term, for each vertex, the mean probability vector Vp: in this way, it will try to maximize the class probability. The graph cut can take as a binary term (i.e. connecting two neighboring vertices) the spatial curvature separating these two vertices, or the scalar product between their respective normal. In this way, the graph cut will try to best comply with the class spatial homogeneity except during the crossing of areas of high curvature, while trying to maximize the probability according to vector Vp.

FIG. 6 schematically shows a method 600 for supervised learning of a deep learning network according to one embodiment of the invention. The supervised learning method is applied to a convolutional neural network CNN or more particularly to a fully convolutional network FCN. The deep learning network is trained by providing two-dimensional input images such as that which will be provided by the automatic segmentation method described above. The training is supervised, that is to say that the deep learning network is also provided, during its learning, with the two-dimensional output images associated with the two-dimensional input images in which the classes of tissues are assigned to the pixels, that is to say that the output images are segmented.

To do this, the method comprises the following steps:

a step 602 of acquiring a plurality of three-dimensional surfaces of a plurality of dental arches, in order to obtain a plurality of three-dimensional training representations of the dental arches in a three-dimensional space, said three-dimensional training representations each comprising a set of Np three-dimensional points, called vertices, forming vertices of Nf polygonal, preferably triangular faces;

a step 604 of manually segmenting, by a human operator, each three-dimensional training representation of the dental arch, wherein is assigned to each vertex of the three-dimensional representation a class of dental tissue, so as to obtain a segmented three-dimensional representation for each three-dimensional training representation;

a step 606 of generating, for each three-dimensional representation of M two-dimensional virtual views from the three-dimensional training representation; For each three-dimensional training representation, m two-dimensional virtual views are generated in the same way as in the automatic segmentation method, as described above with reference to FIGS. 4, 5a and 5b.

a step 608 of projecting, for each three-dimensional training representation, the discriminatory value(s) chosen for the three-dimensional training representation on each two-dimensional virtual view, configured to obtain, for each virtual view, a two-dimensional input image representing in each pixel the discriminatory value of the vertex or the polygonal face projecting over the virtual view; this step generates the data which will be provided at the input of the learning network, which are input images 620;

a step 610 of projecting, for each segmented three-dimensional representation, the segmented three-dimensional representation on each two-dimensional virtual view, configured to obtain, for each virtual view, a two-dimensional output image representing, in each pixel, the tooth's dental tissue class or the polygonal face projecting on the two-dimensional output image; this step generates the expected data at the output of the training network, which are output images 622;

a step 612 of training the deep learning network 630 via processing of each pair 624a, 624b, 624c of images comprising an input image and an output image respectively derived from the projection with the same virtual view of each three-dimensional training representation and its associated segmented three-dimensional representation. The deep learning network 630 is thus trained by the pairs 624a, 624b, 624c of images, knowing the expected input and output of the segmentation method.

Once the learning network has been sufficiently trained, the automatic segmentation method can perform the automatic segmentation without manual intervention.

The invention claimed is:

1. A method for automatic segmentation of a dental arch, comprising:

acquiring a three-dimensional surface of the dental arch, in order to obtain a three-dimensional representation of the dental arch in a three-dimensional space, said three-dimensional representation comprising a set of three-dimensional points, referred to as vertices, forming vertices of polygonal, preferably triangular, faces;

generating two-dimensional virtual views from the three-dimensional representation, comprising a step of determining the characteristics of the virtual views comprising a sub-step of determining a wireframe representing the general shape of the dental arch and a sub-step of determining the characteristics of the virtual views by selecting virtual views distributed along the wireframe and directed towards the wireframe;

projecting the three-dimensional representation on each two-dimensional virtual view, configured to obtain, for each virtual view, an image representing each vertex and each polygonal face visible on the virtual view;

processing each image by a previously trained deep learning network, associating, with each pixel of each image, a probability vector, each index of the vector representing the probability of said pixel belonging to a class of dental tissues, from among multiple classes of dental tissues of a same size as the probability vector;

carrying out inverse projection of each image so as to assign to each vertex of the three-dimensional representation one pixel for each image on which the vertex appears and to which it corresponds, and assigning to each vertex the probability vector(s) associated with said one or more pixels; and, determining, for each vertex, the dental tissue class to which said vertex most probably belongs based on the probability vector(s) assigned to said vertex.

2. The method for automatic segmentation of a dental arch according to claim 1, further comprising, prior to processing each image by the learning network, assigning each pixel of each image at least one discriminatory value, said discriminatory value being representative of a characteristic of the vertex when said pixel corresponds to a vertex on the virtual view, and to an interpolation of the characteristics of the vertices of the polygonal face when said pixel corresponds to a polygonal face on the virtual view.

3. The automatic segmentation method according to claim 2, wherein the discriminatory value may be of a value type selected from the following list of value types:

a vertex RGB value obtained during the acquisition of a three-dimensional surface;

a value of three-dimensional curvature at the vertex;

a distance value between the vertex and an optical center of the virtual view on which it projects;

an angle between a normal of the vertex and a direction of sight of the virtual view.

4. The method for automatic segmentation of a dental arch according to claim 1, wherein each virtual view is defined by an optical center (Co) comprised in the three-dimensional space, and by a picture-taking direction along a picture-taking axis.

5. The method for automatic segmentation of a dental arch according to claim 1, wherein the number of two-dimensional virtual views generated is between 30 and 90 views, preferably between 50 and 70 views.

6. The method for automatic segmentation of a dental arch according to claim 1, wherein the step of determining, for each vertex, the dental tissue class to which it most probably belongs comprises the execution of a graph cut algorithm taking as a parameter for each vertex said one or more probability vectors assigned to said vertex.

7. A computing device comprising a non-transitory computer readable storage medium having program instructions stored therein, the instructions being executable by at least one processing core of a processing unit to cause the processing unit to perform a method for automatic segmentation of a dental arch, the device comprising:

a computing module of the program instructions for acquiring a three-dimensional surface of the dental arch, configured to obtain a three-dimensional representation of the dental arch in a three-dimensional space, said three-dimensional representation comprising a set of three-dimensional points, referred to as vertices, forming vertices of polygonal, preferably triangular, faces;

a computing module of the program instructions for generating two-dimensional virtual views from the three-dimensional representation, configured to determine the characteristics of the virtual views by determining a wireframe representing the general shape of the dental arch and by determining the characteristics of the virtual views by selecting virtual views distributed along the wireframe and directed towards the wireframe;

a computing module of the program instructions for projecting the three-dimensional representation on each two-dimensional virtual view, configured to obtain, for each virtual view, an image representing each vertex and each polygonal face visible on the virtual view;

a computing module of the program instructions for processing each image by a previously trained deep learning network, associating, with each pixel of each image, a probability vector, each index of the vector representing the probability of said pixel belonging to a class of dental tissues, from among different classes of dental tissues of a same size as the probability vector;

a computing module of the program instructions for carrying out inverse projection of each image so as to assign to each vertex of the three-dimensional representation one or more pixels of the images wherein the vertex appears and to which it corresponds, and assigning to each vertex the probability vector(s) associated with said one or more pixels; and, a computing module of the program instructions for determining, for each vertex, the dental tissue class to which said vertex most probably belongs based on the probability vector(s) assigned to said vertex.

* * * * *